Figure 1:
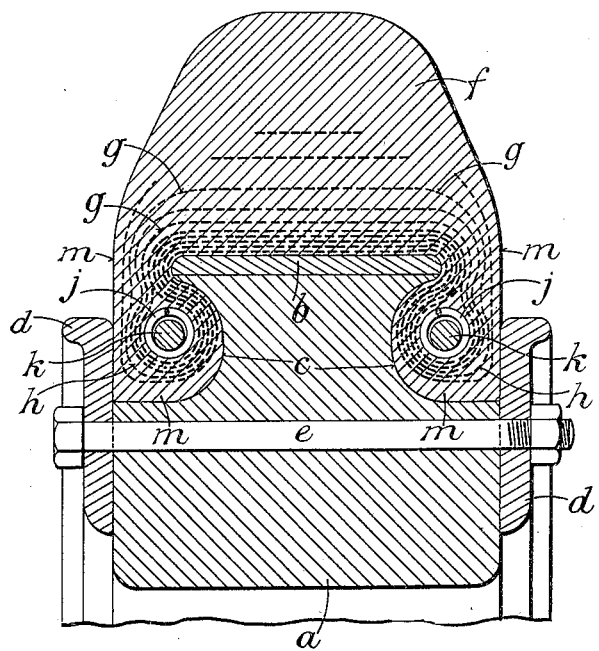

No. 793,508. PATENTED JUNE 27, 1905.
A. T. COLLIER.
ELASTIC TIRE FOR VEHICLES.
APPLICATION FILED NOV. 28, 1904.

2 SHEETS—SHEET 1.

Witnesses
James L. Norris Jr.
C. W. Kesler

Inventor
Arthur T. Collier
By James L. Norris.
Atty.

No. 793,508. PATENTED JUNE 27, 1905.
A. T. COLLIER.
ELASTIC TIRE FOR VEHICLES.
APPLICATION FILED NOV. 28, 1904.

2 SHEETS—SHEET 2.

Witnesses:
James L. Norris, Jr.
C. D. Kesler

Inventor
Arthur T. Collier
By James L. Norris.
Atty.

No. 793,508.    Patented June 27, 1905.

UNITED STATES PATENT OFFICE.

ARTHUR THOMAS COLLIER, OF ST. ALBANS, ENGLAND, ASSIGNOR TO THE REILLOC TYRE COMPANY, LIMITED, OF LONDON, ENGLAND, A CORPORATION OF GREAT BRITAIN.

ELASTIC TIRE FOR VEHICLES.

SPECIFICATION forming part of Letters Patent No. 793,508, dated June 27, 1905.

Application filed November 28, 1904. Serial No. 234,619.

*To all whom it may concern:*

Be it known that I, ARTHUR THOMAS COLLIER, a subject of the King of Great Britain, residing at St. Albans, Herts, England, have invented certain new and useful Improvements in and Relating to Elastic Tires for Vehicles, of which the following is a specification.

This invention relates principally to the means adopted for holding the india-rubber or like elastic material of an elastic tire to a wheel-rim so as to avoid packing a large portion of the india-rubber or like elastic material inside the upturned flanges of the rim.

In tires heretofore in general use a channeled steel rim is employed with the sides more or less incurved to bite into and hold the india-rubber, and in many cases this means of holding is supplemented by wires passing through the india-rubber either longitudinally or transversely. Owing to the elastic nature of india-rubber, it has been found that it is necessary when employing these means to make the walls of the channel on the rim of considerable height in proportion to the total height of the elastic tire, and as the india-rubber inside the said channel is tightly held that portion of the tire does not contribute to the resilience of the tire and except for the purpose of holding the tire to the rim is wasted.

The object of this invention is to prevent this waste of india-rubber, for which purpose the whole of the elastic tire is placed above the holding-flanges of the wheels, and at the same time the use of a channeled rim which cuts the india-rubber and causes it to wear away when in use at the upper edges of the channel, owing to the constant friction at those points, is avoided. To effect these objects, during the process of forming the tire layers of canvas are embedded at intervals in the india-rubber throughout the section of the tire, and the said canvas is brought through the lower sides of the india-rubber to form circumferential strips or tags, by means of which the tire can be held to the wheel in various suitable ways. These strips or tags are preferably covered with india-rubber. The canvas layers are preferably inserted in the body of the tire during the manufacture thereof and before it is vulcanized and are preferably of an open network nature, so as to prevent the liability of the india-rubber peeling from the canvas when the tire is in use. In tires for use on the driving-wheels of a motor-vehicle it is preferable to employ canvas strips cut on the bias, so that the stress shall be as nearly tangential as possible; but in other cases the canvas may be cut on the straight. The improved tire can be made in continuous lengths or "spued," and in such tires there will be a division in the tire where the ends are brought together, and canvas cut on the straight will be the more suitable. Canvas cut on the straight is also used in cases where it is desired to provide for renewing portions of the tire without renewing the whole of the tire. In some cases in lieu of woven canvas cords or the like embedded in the india-rubber may be used.

By the said invention it is possible to allow free movement of the whole of the india-rubber in the tire in every direction, thus rendering it available for its legitimate purpose of cushioning the wheel. Another advantage of the improved solid tire is the ease of renewal, as the user can affix the tire himself.

Figure 3:
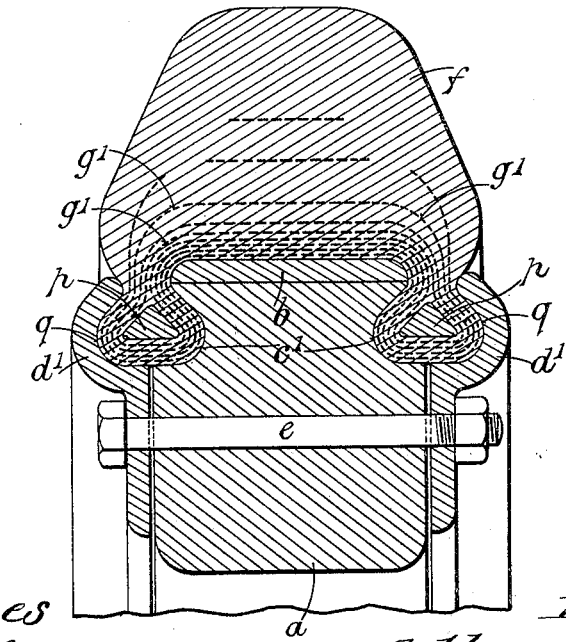
Figure 2:
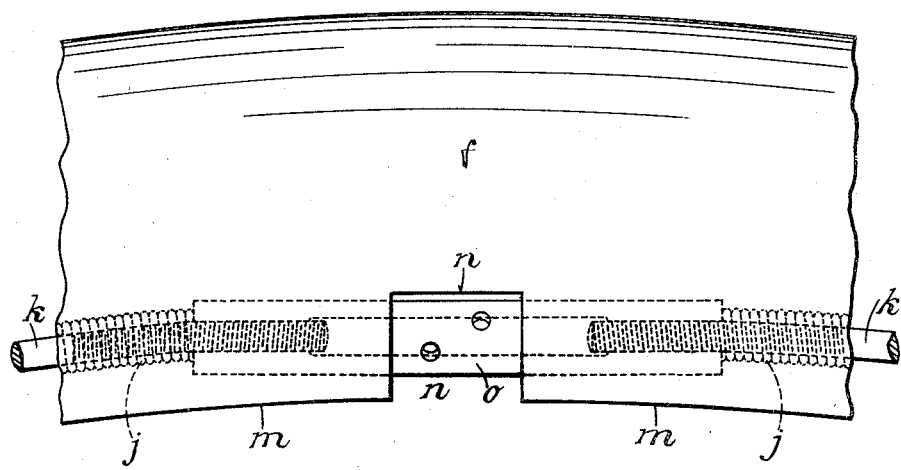

In the accompanying drawings, Figure 1 is a transverse section of a tire and rim employed therewith, showing how the said invention may be conveniently and advantageously carried into practice; and Fig. 2 is a side view of a portion of a tire, showing the barrel-nut for tightening the retaining-wire. Fig. 3 is a similar view to Fig. 1, showing a modification of the improved tire.

*a* is a wheel-felly which is provided with a metal tire *b* and with lateral channels or recesses *c c*. These channels are arranged below—*i. e.*, nearer to the center of the wheel than the iron tire *b*—and have their outer walls formed by flanged rings *d d*, which are also arranged below the iron tire *b* and are detachably secured in position by means of bolts *e e* extending transversely through the felly *a*.

$f$ is the india-rubber or other elastic tire, which has embeded therein during its manufacture layers $g\ g$ of canvas of an open network nature, which are arranged at intervals, as shown, so as to be separated by layers of india-rubber, thus permitting compression to take place between the layers and imparting resiliency to the tire. These layers of canvas converge toward the lower edges of the bottom or foot of the tire, where they extend out to form fastening-strips $h\ h$ and pass round spiral wires $j\ j$, which form passages through which the fastening-wires $k\ k$ can pass freely. The canvas in the said fastening-strips is covered externally with india-rubber, as at $m\ m$, so as to protect it from moisture and at the same time form a fluid-tight joint between the tire and the felly $a$. The ends of the fastening-wires $k\ k$ may be advantageously joined by nuts $o$, having right and left handed screw-threads, so as to enable them to be tightened and loosened as required, or one end of the barrel-nut may engage a collar on the wire, the other end being screw-threaded. By forcing apart the ends of the wires or rods $k\ k$ by means of the said nuts or screw-couplings the edges of the tire may be conveniently enlarged to enable it to be placed onto or removed from a wheel. Preferably the wires and nuts are built into the tire in the manufacture thereof, openings $n$ being subsequently cut in the side strips or tags, as shown in Fig. 2, to expose the nuts $o$ or tightening devices, so that the same can be operated by a tommy or otherwise in the well-known manner.

Another means of attachment that may be employed is shown in Fig. 3 and comprises, $e.\ g.$, four strips of canvas $g'$, extending transversely through the india-rubber $f$ near the middle of its section and passing down near the sides to the lower corners, at each of which corners they extend around a strip or piece $p$ of hard rubber or suitable material and then up again into the india-rubber about midway between the middle and the base of the tire. The beadings so formed are preferably wedge-shaped, with the apex upward or outward, and may be covered with thin metal to facilitate a sliding downward movement when the holding-flanges $d'$ (each of which has a corresponding groove $q$ in it) are tightened against the sides of the wheel, which also may have grooves $e'$ to correspond with those in the holding-flanges $d'$. The beadings may, however, be of any shape in cross-section, such as circular or square.

In cases where the vehicle is required to carry very heavy loads two of the improved tires may be arranged side by side on the fellies.

What I claim is—

1. A solid tire of india-rubber or like material, layers of fabric embedded therein at intervals throughout the section thereof, said layers of fabric converging toward the sides of the foot thereof where they extend to the exterior, spiral wires arranged in the parts of said fabric external to said tire, wires extending through the passages in said spiral wires, and means for drawing together and forcing apart the ends of said wires within said spiral wires.

2. The combination, with the felly or rim of a vehicle-wheel having lateral recesses on each side of its outer peripheral surface, of a solid tire of india-rubber or like material, layers of fabric embedded in said tire and extending out of said tire at the sides thereof and resting in the lateral recesses in said felly or rim, spiral wires arranged in the parts of said fabric external to said tire, wires extending through the passages in said spiral wires, means for drawing together and forcing apart the ends of said wires within said spiral wires, and flanges detachably secured to the sides of said felly or rim and of a lesser diameter than the outer peripheral surface of said felly or rim.

3. The combination, with the felly or rim of a vehicle-wheel having lateral recesses on each side of its outer peripheral surface, of a solid tire of india-rubber or like material, layers of fabric embedded in said tire and extending out of said tire at the sides thereof and resting in the lateral recesses in said felly or rim, spiral wires arranged in the parts of said fabric external to said tire, wires extending through the passages in said spiral wires and having screw-threaded ends, and screw-couplings for uniting said screw-threaded ends.

4. The combination, with the felly or rim of a vehicle-wheel having lateral recesses on each side of its outer peripheral surface, of a solid tire of india-rubber or like material, layers of fabric embedded in said tire and extending out of said tire at the sides thereof and resting in the lateral recesses in said felly or rim, spiral wires arranged in the parts of said fabric external to said tire, wires extending through the passages in said spiral wires and having screw-threaded ends, screw-couplings for uniting said screw-threaded ends, and flanges detachably secured to the sides of said felly or rim and of a lesser diameter than the outer peripheral surface of said felly.

5. A solid tire of india-rubber or like material, layers of fabric embedded therein and extending out of the same at the sides thereof, spiral wires arranged in the parts of said fabric external to said tire, a layer of india-rubber or like material covering the external parts of said fabric, wires extending through the passages in said spiral wires, and screw-couplings for connecting the ends of the wires in said spiral wires.

6. The combination, in a wheel, of a metal tire, a felly or rim having recesses formed therein on each side of said metal tire, said recesses being of less diameter than said metal tire, a solid tire of india-rubber or like material, layers of fabric embedded in said tire and extending out of said tire at the sides thereof and resting in the lateral recesses in said felly or rim, a spiral wire in the parts of said fabric external to said tire, a wire extending through the passage in said spiral wire, means for drawing together and forcing apart the ends of said non-spiral wire, and flanges detachably secured to the sides of said felly or rim and of a less diameter than the outer peripheral surface of said felly or rim but of a greater diameter than the parts of said lateral recesses nearest to the axis of the wheel.

7. The combination with the felly or rim of a vehicle-wheel having recesses on each side of its outer peripheral surface, of a solid tire formed of elastic material and having lateral fastening strips or tags, layers of fabric of an open network nature embedded at intervals in the cross-section of said solid tire, said layers of fabric converging toward the sides of the foot of said solid tire where they extend into said fastening strips or tags, spiral wires in said strips or tags, rods extending through the passages in said spiral wires and screw-couplings for drawing together and forcing apart the ends of said rods.

8. The combination with the felly or rim of a vehicle-wheel having recesses on each side of its outer peripheral surface, of a solid tire formed of elastic material and having lateral fastening strips or tags, layers of fabric of an open network nature which are cut on the bias and are embedded at intervals in the cross-section of said solid tire, said layers of fabric converging toward the sides of the foot of said solid tire where they extend into said fastening strips or tags, spiral wires in said strips or tags, rods extending through the passages in said spiral wires and screw-couplings for drawing together and forcing apart the ends of said rods.

9. The combination with the felly or rim of a vehicle-wheel having recesses on each side of its outer peripheral surface, of a solid tire formed of elastic material and having lateral fastening strips or tags, layers of fabric of an open network nature embedded at intervals in the cross-section of said solid tire, said layers of fabric converging toward the sides of the foot of said solid tire where they extend into said fastening strips or tags, spiral wires in said strips or tags, rods extending through the passages in said spiral wires, screw-couplings for drawing together and forcing apart the ends of said rods, and flanges detachably secured to the sides of said felly or rim and of a diameter not exceeding that of the outer peripheral surface of said felly or rim.

10. A solid tire formed of elastic material and having lateral fastening strips or tags, layers of fabric of an open network nature cut on the bias and embedded at intervals in the cross-section of said tire, said layers of fabric converging toward the sides of the foot of said tire where they extend into said strips or tags, spiral wires located in the fabric in said strips or tags, rods extending through the passages in said spiral wires, and screw-couplings for drawing together and forcing apart the ends of said rods.

In testimony whereof I have hereunto set my hand in presence of two subscribing witnesses.

ARTHUR THOMAS COLLIER.

Witnesses:
GEORGE HARRISON,
HERBERT A. BEESTON.